(12) United States Patent
Stoddard

(10) Patent No.: US 9,086,690 B2
(45) Date of Patent: Jul. 21, 2015

(54) UNIFORM SYNCHRONIZING ROBOT CONTROL AND DEADLOCK DETECTION IN UNIFORM SYNCHRONIZATION

(71) Applicant: KUKA Robotics Corporation, Sterling Heights, MI (US)

(72) Inventor: Kenneth A. Stoddard, Rochester, MI (US)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 14/156,004

(22) Filed: Jan. 15, 2014

(65) Prior Publication Data

US 2014/0128995 A1 May 8, 2014

Related U.S. Application Data

(62) Division of application No. 13/181,558, filed on Jul. 13, 2011, now Pat. No. 8,639,364.

(51) Int. Cl.
*G05B 11/01* (2006.01)
*B25J 9/16* (2006.01)
*G05B 19/418* (2006.01)

(52) U.S. Cl.
CPC .............. *G05B 11/01* (2013.01); *B25J 9/1669* (2013.01); *G05B 19/41815* (2013.01); *G05B 19/41865* (2013.01)

(58) Field of Classification Search
CPC ................... G05B 19/41815; G05B 19/41865; B25J 9/1669

USPC ........................................................... 700/14
See application file for complete search history.

(56) References Cited

U.S. PATENT DOCUMENTS

| | | | | |
|---|---|---|---|---|
| 5,254,923 A | * | 10/1993 | Kanitani ................... | 318/568.11 |
| 5,450,573 A | * | 9/1995 | Gronemeyer ................. | 713/375 |
| 5,798,627 A | * | 8/1998 | Gilliland et al. ......... | 318/568.14 |
| 5,825,981 A | * | 10/1998 | Matsuda ....................... | 700/248 |
| 6,804,580 B1 | * | 10/2004 | Stoddard et al. .............. | 700/248 |
| 8,639,364 B2 | | 1/2014 | Stoddard | |
| 2003/0220715 A1 | * | 11/2003 | Kneifel et al. ................ | 700/248 |
| 2004/0030452 A1 | * | 2/2004 | Graf et al. .................... | 700/245 |
| 2004/0162706 A1 | * | 8/2004 | Tudor .......................... | 702/186 |
| 2004/0199290 A1 | * | 10/2004 | Stoddard et al. .............. | 700/248 |

* cited by examiner

*Primary Examiner* — Robert Fennema
*Assistant Examiner* — Sivalingam Sivanesan
(74) *Attorney, Agent, or Firm* — Wood, Herron & Evans, LLP

(57) ABSTRACT

Control programs for robotic systems are synchronized through the use of synchronization objects which control access to shared resources and allow for sequencing of events in separate program threads. Where necessary, partner objects generate between control programs and synchronization objects to assure uniform interaction between control program threads and synchronization objects. As all synchronization objects contain searchable partner lists, actual simulated and runtime deadlocks including any type of synchronization object can be detected, and the full system can be analyzed to identify potential deadlocks.

6 Claims, 14 Drawing Sheets

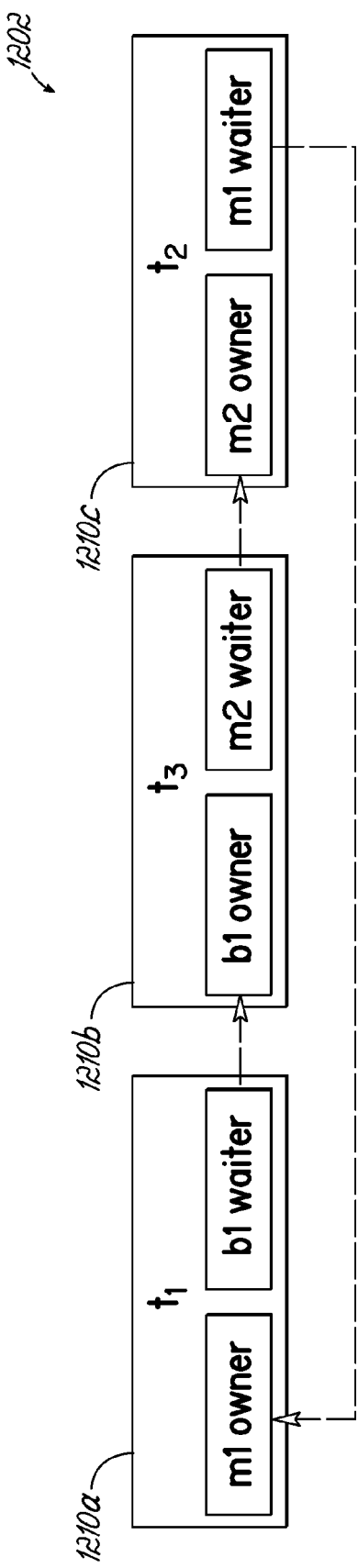

UNIFORM SYNCHRONIZING ROBOT CONTROL AND DEADLOCK DETECTION IN UNIFORM SYNCHRONIZATION

CROSS-REFERENCE

This application is a divisional of U.S. patent application Ser. No. 13/181,558 filed Jul. 13, 2011 (Pending), the disclosure of which is expressly incorporated by reference herein in its entirety.

FIELD OF THE INVENTION

The invention relates to synchronizing robot control, and more particularly to controlling synchronization objects associated with control programs and detecting and preventing deadlock of control programs.

BACKGROUND OF THE INVENTION

In automated control environments, such as industrial robotic systems, synchronization objects may be utilized by one or more control programs, and controlling and synchronizing access and utilization of the synchronization objects typically requires complex and error prone programming to interface the synchronization object and the control programs. Moreover, in conventional systems, the types of synchronization objects encountered in a typical industrial robotic system varies, which increases complexity and leads to errors in programming the interfaces for each synchronization object.

As automated control environments become more advanced and complex, the number of synchronization objects and control programs increases. In conventional systems, the advancements have led to increased difficulty in synchronizing the control programs and the synchronization objects. In automated control environments, synchronization objects may be of different types, where the type of synchronization object dictates how control programs may interact and utilize the synchronization object. The types of synchronization objects typically present in an automated control environment include mutex, rendezvous, barrier, buffer, fixture, handoff, sequence element, multi-sequence element, and time synchronization.

A mutex type synchronization object allows only one control program to utilize the synchronization object at a time. In automated control environments, such as industrial robotic systems, for example, a mutex synchronization object may allow only one robot control program to enter and utilize the synchronization object, while making another control program wait, which may be useful, for example, for preventing robots from colliding, etc.

A rendezvous type synchronization object requires two control programs to "rendezvous" or wait for each other to acquire the synchronization object, at which time both will release the synchronization object and proceed. (Note: rendezvous does NOT necessarily mean concurrent execution, but only simultaneous presence at a point in the control programs.) In automated control environments, such as industrial robotic systems, for example, a rendezvous synchronization object may require a first control program to wait for a second control program at a predefined location, or meeting point, such that when both control programs "arrive" at the location, the two programs may then proceed. A barrier type synchronization object is an extended form of rendezvous, where more than two control programs meet at a predefined location before proceeding. In conventional systems, a counter associated with the barrier synchronization object increments when a control program arrives, and when the counter reaches a predefined value, the barrier synchronization object allows the control programs to proceed.

A buffer type synchronization object differentiates control programs by what action the control program will execute while utilizing the buffer. A producer control program will place items in a buffer, and a consumer control program will remove items from the buffer. For example, in industrial robotic systems, a first control program may execute to place parts in a buffer, and a second control program may execute to remove parts from the buffer. A buffer synchronization object typically allows only one control program to utilize the buffer at a time, and also limits utilization by consumers and producers depending on whether the buffer is empty or full.

A fixture type synchronization object is a special form of buffer with a capacity of one, hence a consumer is allowed to utilize the fixture only if a producer has previously deposited an item at the fixture, and similarly, a producer is allowed to utilize the fixture only if there is not an item already deposited at the fixture. For example, in industrial robotic systems, a fixture synchronization object may be designed to facilitate transfer of parts among robots.

A handoff type synchronization object facilitates transfer of items among control programs. For example, in industrial robotic systems, a handoff facilitates transfer of a part from one robot to another robot without the need for a buffer or fixture. Hence, in contrast to a buffer or fixture, a handoff type synchronization object typically requires more than one control program to concurrently execute within the handoff synchronization object to enable the transfer.

A sequence element type synchronization object is a form of a barrier in which all control programs do not have to wait for others to arrive. A sequence element does not require control programs to be simultaneously present; however, all control programs must pass the synchronization object. In addition, a sequence element differentiates between control programs into signaling and waiting control programs, where a signaling control program must merely signal that it has passed the synchronization object, while a waiting control program must wait for all signalers to pass. In conventional systems, a counter associated with the sequence element is incremented when a signaler passes or a waiter arrives, and when the counter reaches a predefined number, the waiters are allowed to proceed.

Multi-sequence elements are essentially a group of related sequence elements which generally involve the same set of control programs, and wherein each sequence element may have different signaling and waiting control programs. A counter may be used for each element, and may re-initialize and reset count between elements. Like a hand-off, a multi-sequence element can be used to synchronize several steps between control programs coordinating for common procedure or to interface with a single component.

A time synchronization object forces parallel execution of control programs. In industrial robotic systems, a time synchronization object is commonly used to coordinate motion execution among robots controlled by different control program threads.

Examples of automated systems utilizing mutex objects to synchronize program execution can be found in U.S. Pat. No. 7,144,147 to Chafee et al. entitled "System controlling exclusive access by control programs to system resources". Examples of automated systems utilizing barrier objects can be found in U.S. Pat. No. 7,024,250 to Graf et al. entitled "Method and apparatus for the synchronous control of manipulations".

The difficulties and complexities encountered in designing and operating environments incorporating a plurality of the above described synchronization objects and having a plurality of control programs may lead to deadlock of control programs. As those skilled in the art will recognize, a mutex deadlock is a situation where two or more control programs are each waiting for another control program to begin and/or complete utilization of a shared resource in a circular chain, such that each control program may never begin and/or complete utilization. A deadlock may typically be identified if four conditions, known as "Coffman Conditions," for the mutex objects are met: (1) mutual exclusion—a shared resource cannot be used by more than one control program at a time (this is the definition of a "mutex" object); (2) hold and wait—control programs already holding a resource may request new resources; (3) no preemption—no resource can be forcibly removed from a control program holding it; and (4) circular wait—two or more control programs form a circular chain where each control program waits for a resource that the next control program in the chain holds. Deadlocks related to resource sharing are particularly common in multiprocessing, where two or more control programs may share a mutex type synchronization object.

But there are also deadlocks related to combinations of all the above mentioned synchronization objects, not just those associated with mutex objects. These deadlocks are particularly troublesome, because analysis, detection, prevention etc. based only on Coffman Conditions related to mutex objects is insufficient.

In automated control environments, such as industrial robotic systems, deadlock of control programs can lead to halts in production and require significant time to determine the cause of the deadlock and attempt to resolve the deadlock. Moreover, in many automated control environments, it can be difficult or impossible to "unwind" a system sufficiently to eliminate a deadlock without the waste of expensive components or the expenditure of significant time. In some cases, significant manual operation of components of the system may be necessary to solve a deadlock, and additional errors may occur while the system is not functioning according to its automated programming.

In control environments that regularly operate on a set schedule, control programs may run hundreds or thousands of times without resulting in a deadlock before an alteration of the timing in one or more of the programs results in a previously undetected deadlock. In many automated systems, deadlocks have historically been detected and corrected through trial and error. It is costly to design, build, and install industrial machines that may not, when activated, successfully work together as intended.

Consequently, there is a continuing need in the art for a way to detect deadlocks after they occur, known in the art as deadlock detection. There is also a need in the art to find ways to predict and circumvent deadlocks during execution of control programs, known in the art as deadlock avoidance. And finally, there is a continuing need in the art to detect potential deadlocks among control programs during design time, before the programs are executed, known in the art as deadlock prevention. Many of the techniques in the art for avoidance are not practical in industrial applications. For example, while we can back up or unwind an airline reservation to avoid a deadlock, we cannot usually unwind production of products in factories. This invention is therefore related to detection and prevention of deadlocks among control programs that include any combination of synchronization object types.

SUMMARY OF THE INVENTION

The present invention allows for the detection of both actual and potential deadlocks between control programs in automated control environments. Deadlocks that involve any synchronization objects, including mutex, rendezvous, barrier, buffer, fixture, handoff, sequence element, multi-sequence element, and time synchronization objects in any combination, can be detected by the methods discussed herein.

Other aspects of the present invention expand the definition of "owners" and "waiters" to apply to all types of synchronization objects, and map partners to all synchronization objects. These steps allow the system to search for control programs that are each waiting on an object owned by another control program, allowing the system to identify the deadlocks.

Actual deadlocks are identified during control program execution by the use of searches to find a cycle of control program threads, each of which waits on a synchronization object owned by the next thread in the cycle. Potential deadlocks are identified before control program execution by conducting these searches on a synchronization matrix which includes the possible sequences of synchronization object actions taken by each thread.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

FIG. 12' is another diagram illustrating deadlock points associated with the synchronization matrix of FIG. 12;

FIG. 12A is a diagram illustrating a circular wait cycle in accordance with the synchronization matrix of FIG. 12;

DETAILED DESCRIPTION

The present invention presents analysis tools that allow for deadlock detection and prevention among a variety of system functions by standardizing the interface between control programs and synchronization objects and by tracking the use of synchronization objects in such a way that actual and potential deadlocks can be identified and rectified.

A first key component to this is the standardized identification of synchronization objects into one of the above categories—mutex, rendezvous, barrier, buffer, fixture, handoff, sequence element, multi-sequence element, and time synchronization—each of which interface with control program threads using a standardized protocol further explained herein.

Each synchronization object includes a partner list, which is a complete list of the threads interacting with that object. A partner list for each partner object includes the list of partners that may wait for, own, or signal a synchronization object. It is the existence of this partner list for each synchronization object that allows the identification of the circular wait characteristic of a deadlock and further outlined below.

Figure 1:
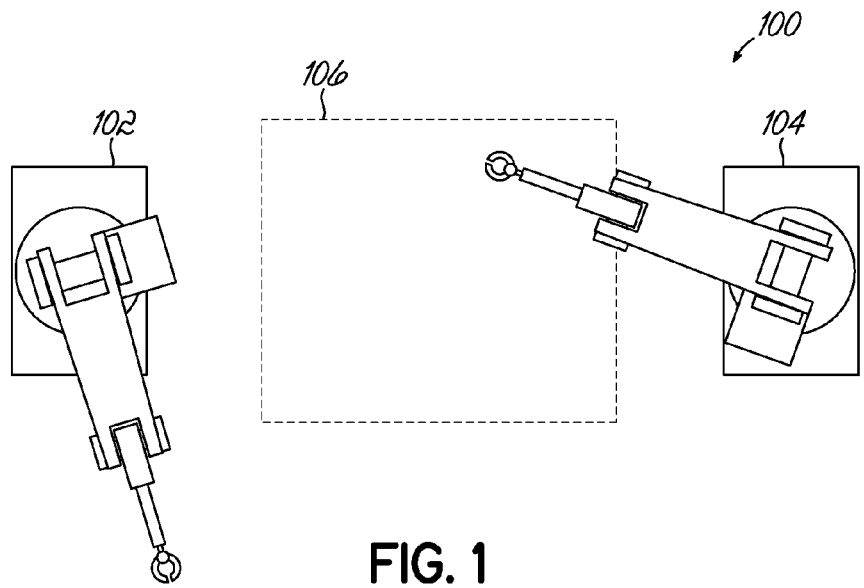
FIG. 1 is an illustration of two robotic arms and a shared resource as part of a robotic control system consistent with embodiments of the invention.

Turning to the drawings, FIG. 1 illustrates a pair of robotic arms 102, 104 which may be components of an industrial robotic system 100. Each of the arms 102, 104 may operate within a zone 106 to interface with an industrial product. The zone 106 may therefore form a shared resource such that it is necessary to control and synchronize the interaction between each of the arms 102, 104 with respect to entrance into and exit from the zone 106. The behavior of each robot arm 102, 104 may be under the control of a different program thread, each of which is associated with a controller 200 as illustrated in FIG. 2.

Figure 2A:
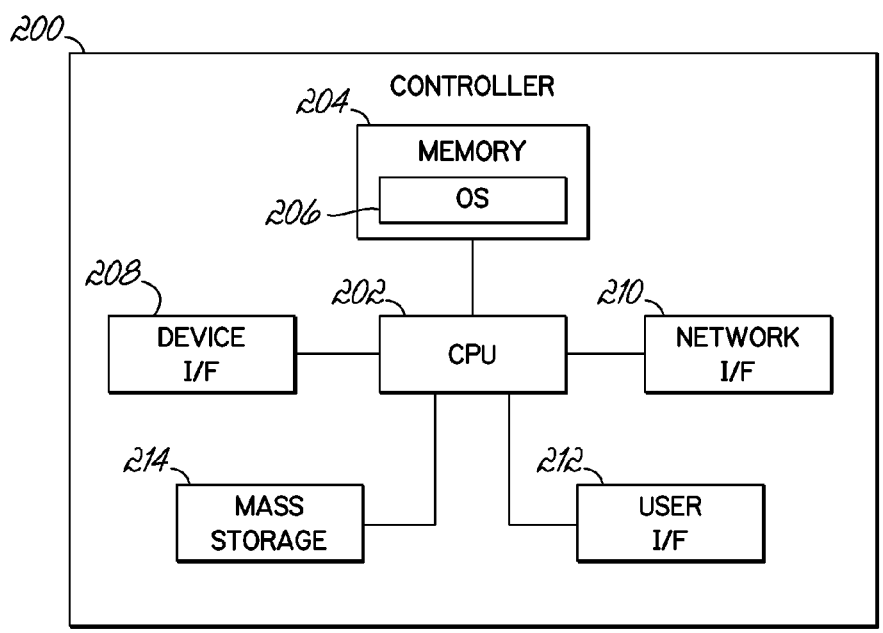
FIG. 2A is a block diagram of a controller consistent with embodiments of the invention.

FIG. 2A illustrates a controller 200 including a processor 202 and memory 204 which may include an operating system 206. The system may further include one or more device interfaces 208 for driving automated components, one or more network interfaces 210 to other controllers or data processing components, one or more user interfaces 212 providing information and/or control to an operator, and one or more mass storage elements 214 including additional data or instructions not present in memory 204. Each of these components of a controller 200 is known to one of ordinary skill in the art as part of a computer or other control device for use in managing one or more control programs for automated control environments such as industrial robotic systems. Any number of controllers having components similar to those of the controller 200 may be associated with different control program threads which need to interact in a synchronized fashion, sharing resources and timing in order to carry out the programming associated with the system.

The methods characterized herein allow for the coordination of many control program threads which may be carried out on the same or different controllers and may be carried out across multiple data processing components. One of ordinary skill will recognize the localization of control program threads to controllers associated with individual robotic components, as well as the centralization of control program threads to controllers communicating with and common to whole steps of an industrial process.

It will be recognized that the specific configuration and location of program code on one or more controllers is a consideration depending on the nature of the system, and that the synchronization methods and objects disclosed herein are not limited to any particular configuration of controllers and other data processing devices and systems. For example, it will be understood that methods consistent with the present invention may be carried on an industrial system which includes a communication network, and that some or all execution instructions of control programs as further described below may be transmitted over the communications network to be carried out at locations physically or electronically distant from the controllers. The communications network may use any medium for data transmission as known in the art, including the use of wireless transceivers to send and receive instructions.

As used herein, the terms "control program", "thread", "program thread", "control program thread", and the like, are interchangeable terms denoting a single partner for a synchronization object, which may need to be placed in sequence with other control program threads by means of synchronization objects and may execute operations involving one or more robots or other apparatuses in an automated industrial process.

While allowing flexibility in the configuration of these programming threads, the control program threads' interaction is standardized as herein described, arriving at each synchronization object in sequence, "entering" that object and possibly waiting at the enter point, continuing execution, and finally "exiting" the object, based on the state of other partners to the synchronization object. In this way, synchronization operations can control and synchronize a diverse collection of control programs including any combination of synchronization objects.

Figure 2B:
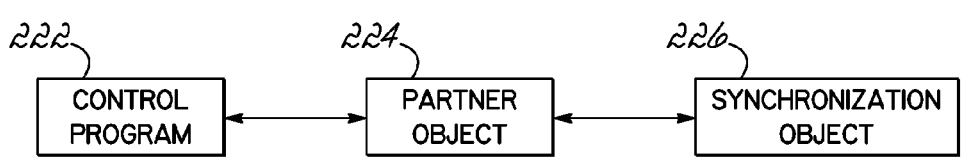
FIG. 2B is a block diagram of the relationship among programming objects within a control system consistent with embodiments of the invention.

One implementation of the interaction between control programs and synchronization objects is the use of partner objects, which may be components of or generated by the control programs or may be generally separate from them. The partner object acts as an intermediary between a synchronization object and a control program. As illustrated in FIG. 2B, a control program 222 interfaces with a partner object 224, which in turn interfaces with a synchronization object 226. Each control program 222 may run differently, but the partner object 224 translates the operation of the control program 222 into standardized actions known to the synchronization object 226, such as enter, exit, and step (each of which is further described with respect to the synchronization matrix examples below). The synchronization object 226 may provide status information to the partner object 224, such as that a mutex object is already owned or a barrier object cannot yet be passed. When this occurs, the partner object 224 can interrupt the execution of the thread of the control program 222 until the synchronization object 226 signals that the resource is available or the barrier satisfied. Once the synchronization object 226 signals the partner object 224 that the resource can be owned or the barrier passed, the partner object 224 can resume execution of the thread of the control program 222 with its revised state with respect to the synchronization object 226 registered by the synchronization object 226 and taken into account in further execution. Note that the partner object 224's ability to interrupt and resume execution of the control program 222, or to otherwise force the control program 222 to wait, is a necessary component of synchronizing different control program threads by means of the synchronization objects.

By allowing for the existence of partner objects where necessary to interface between control programs and synchronization objects, the interaction of control program threads with synchronization objects can be greatly standardized, which allows the analysis of program behavior, including deadlocks, as further discussed herein. It is therefore understood that a partner object may function as an intermediary between the partner thread itself and the synchronization object in any of the embodiments and illustrations herein.

In addition to including partner lists for all kinds of synchronization objects, in order to allow for deadlock detection and analysis as disclosed herein, it is important to expand the definition of "owner" and "waiter" to apply to all kinds of synchronization objects, not just mutex objects. Typically, an "owner" is defined as a control program using a mutex to the exclusion of other programs. A "waiter" is defined as a control program that is paused at a mutex currently in exclusive use by another program.

Conventional systems may be capable of detecting a deadlock among mutex objects by identifying waiter-owner pairs. A line is drawn from each control program currently waiting on a mutex resource to the owner of that mutex. If the lines result in a cycle, such that each control program in the cycle is waiting on a mutex owned by the next control program in the cycle, then a deadlock exists. This is a fulfillment of Coffman Condition 4, the circular wait.

In order to expand our detection ability to include synchronization objects other than mutex objects, the definitions of "owner" and "waiter" may be expanded to be applied to other types of synchronization object.

For purposes of this invention, the term "waiter" for a synchronization object is expanded to refer to any control program that is paused after entering that object, pending the action of another object or objects. The term "owner" for a synchronization object is expanded to refer to any control program whose current state with respect to the object could cause another object to be a "waiter".

For a mutex, the expanded definition results in the same designations as before. A control program is a "waiter" for a mutex if it is awaiting the release of the mutex by another program so that it can use the resource. A control program is an "owner" of a mutex if it is currently using the resource; its release of the resource is the action that can release the waiter.

Applying the expanded definition, a control program is a "waiter" for a barrier object if it has "entered" the barrier and is prevented from continuing (its "enter" operation has not returned) because the required partner programs have not yet called their "enter" operation; arriving/entering is the action that the other control programs must take to release the "waiter". Each control program that includes the barrier in its execution thread but has not yet arrived at the barrier is therefore an "owner" for the barrier.

Having modified the definition of "owner" and "waiter" to allow for barrier synchronization objects, it is then possible to modify the Coffman Conditions to reflect the requirements for a deadlock under these expanded definitions. The modified Coffman Conditions (hereinafter MCC) are as follows:

MCC 1: Ownership. Rather than requiring mutual exclusion as a condition, a partner must be able to own a synchronization object. As explained above, this means that its ownership may block the execution of another partner waiting on that synchronization object.

MCC 2: Own and Wait. Slightly more general than "hold and wait", the modified condition is that the partner which owns a synchronization object is also waiting on another synchronization object.

MCC 3: No Forcible Release. More general than forcibly taking a resource from and owner, ownership cannot be forcibly removed from an owning partner. This means a resource cannot be removed from an owning partner, and a barrier cannot be forcibly bypassed by removing owners.

MCC 4: Circular Wait. Two or more partners form a circular chain where each partner waits for a synchronization object that the next partner in the chain owns.

Identifying a deadlock requires the identification of synchronization partners that wait and own different synchronization partners in a circular manner. One method of identifying an existing deadlock may be illustrated by the flowchart 300 of FIG. 3.

Figure 3:
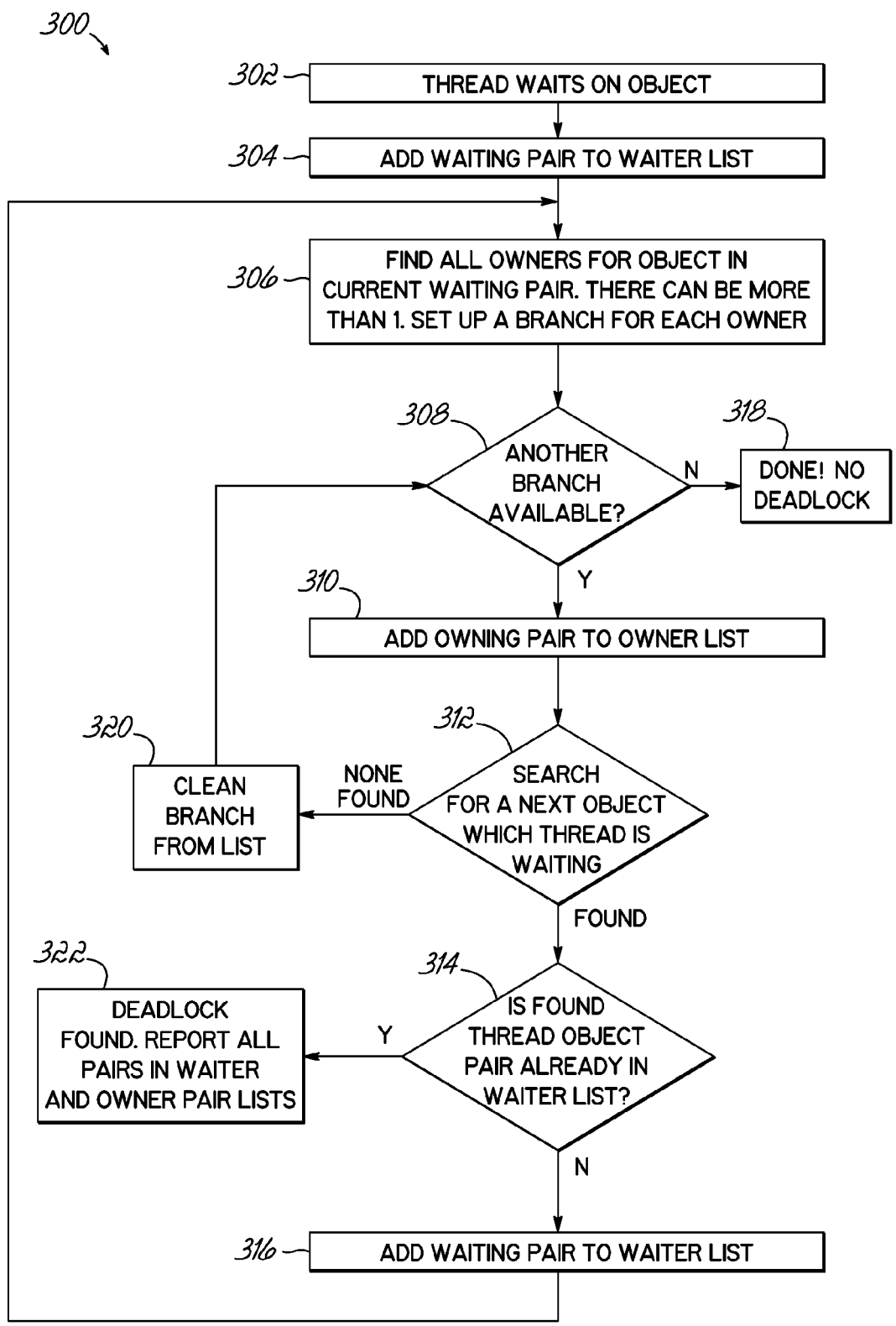
FIG. 3 is a flowchart illustrating a deadlock detection process consistent with embodiments of the invention.

As shown in FIG. 3, a process for identifying an existing deadlock may begin by the identification of a first thread that is a waiter for a first synchronization object (block 302). The method by which the first thread and synchronization object is identified may vary as known in the art. For example, a deadlock evaluation process may occur automatically each time a thread waits for a synchronization object. Alternatively, the process may occur when a waiting state persists for more than a set period of time typical for the wait associated with that thread or synchronization object. Regardless, the result of the process illustrated by the flowchart 300 will be to determine, using the methods according to the present invention, whether the waiting of the first thread at the synchronization object is due to an identifiable deadlock.

A pair representing the first thread and first synchronization object is added to a waiter list (block 304) which may be represented by any sort of appropriate data object as known in the art. Next, a search of the waiting pair object's partner list is performed to identify all threads that currently have an owner relationship with the object (block 306).

Because an object may have multiple owners, particularly in the case of barriers and sequence elements, create a branch for each owner. At any time, each object that is on the waiter list may have multiple owners representing branches, each of which has or has not yet been searched (block 306). As long as another branch is left to be searched (the "yes" branch of decision block 308), the deadlock search continues with the next owner of the object of the last waiting pair on the waiter list representing an owning pair that can be added to the owning list (block 310).

One of ordinary skill will recognize that, together, the waiting list and owning list mentioned with respect to the flowchart 300 of FIG. 3 may represent a single data object including entries representing both waiting and owning pairs, which may be designated as waiting and owning or otherwise marked or indexed to distinguish between them. Various methods for handling data that may represent storage and access of the information contained in the waiting and owning lists are known in the art; the details of the method by which the data is handled to detect a deadlock as explained herein should not be understood to limit the scope of the invention.

As the next owning pair can only be part of a deadlock if the thread is also part of a waiting pair, next determine whether this is the case (decision block 312). If so ("yes" branch of decision block 312), then check the waiter list to determine if the existing pair is already on it (decision block 314). A match for the new waiting pair on the existing waiting list ("yes" branch of decision block 314) represents a circular wait that has resulted in a deadlock. The deadlock has been found, and the waiter and owner lists can be used to report the cycle representing the deadlock (block 322).

If the new waiting pair is not already on the waiting list ("no" branch of decision block 314), then the waiting pair is added to the waiting list (block 316) and the search continues.

If, when evaluating an owning thread, the owning thread is not itself waiting for a synchronization object ("no" branch of decision block 312), then that particular owning thread cannot be part of a circular wait, and the search should continue elsewhere. The waiter, owner, and branch lists are cleaned to remove the pairs associated with the current branch (block 320) and evaluate the search from the next available branch. This cleaning process may involve any number of levels of backtracking in order to find an unexplored branch of the most recently added branch point; when all branches at a given branch point are searched, the branch point may itself be removed and the next upstream branch point searched as is known in the art.

Each branch is evaluated in turn until there is no available branch at any level within the list. Once all available branches stretching back to the very first branch point have been explored without locating a deadlock ("no" branch of decision block 308), then the search is complete and a "no deadlock" result can be returned (block 318).

The above process illustrated in the flowchart 300 determines whether an existing waiting condition persists due to a deadlock. That is, deadlock protection such as that described above is part of deadlock detection. Nothing in the deadlock detection process above requires a full map of a given control program thread; instead, the detection process relies on an identification of current waiting and owning conditions for synchronization objects based on an ability to search a synchronization partner lists or otherwise identify each possible thread that could be currently waiting on or owning each synchronization partner.

In contrast, identifying a possible future deadlock ahead of running a system, part of deadlock prevention rather than deadlock detection, may require the analyzing system to have access to a timeline representing the order that each control program thread interacts with each partner. In one embodiment, this information is represented in a synchronization matrix.

A synchronization matrix includes a row for each thread that is listed as a synchronization partner for any synchronization object. Each row then includes, for its thread, the order of that thread's actions regarding the synchronization objects it partners with. The synchronization matrix may not include any information about the relative timing between threads, but may instead simply include each synchronization object and the action (such as enter, exit, or step) that is next performed by that thread. In this way, analysis of potential deadlocks within the synchronization matrix does not generally depend on the relative timing between threads, but rather assumes that thread timing is only constrained by means of the synchronization objects themselves. In this way, analysis of the synchronization matrix may even pinpoint unlikely deadlocks that only occur rarely in the event of atypical timing between threads.

Figure 4:
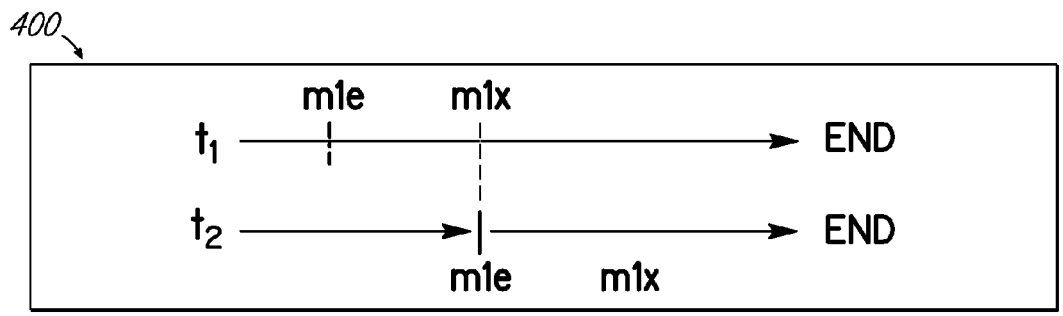
FIG. 4 is a diagram illustrating a synchronization matrix having mutex objects in accordance with embodiments of the invention.

Turning to the drawings, FIG. 4 shows a synchronization matrix 400 which illustrates two control program threads, t1 and t2. It will be understood by one of ordinary skill that the threads t1 and t2 may be controlled by one or more processors operating within one or more controller systems as known in the art. In one embodiment, each of the threads t1, t2 may be generally associated with a single machine component within an automated industrial system, such as a robotic arm. In some cases, one thread may be used to control more than one machine component.

From left to right, each row of the matrix 400 represents the actions of each control program thread t1, t2 with respect to certain synchronization objects—in this case, a mutex represented by m1. At the point where t1 calls its enter operation for m1, it becomes a waiter of m1 until the mutex m1 has no other owner. In this case, the enter operation returns immediately, as there is no other owner, and t1 is allowed to proceed immediately. The label, "m1e" is the point at which t1 is allowed to continue, and it becomes the owner of m1. The dashed line for "m1e" means that t1 becomes the owner immediately and does not have to wait. T1 calls its "exit" operation at "m1 x", and relinquishes ownership at this point. Similarly, at some point along the t2 row t2 does its enter operation, but has to wait until there is no other owner. T2 waits until the point labeled "m1e". The solid bar indicates t2 has to wait at this point. When t2's "enter" operation returns, t2 then becomes the owner of m1, and it can continue. T2 calls its "exit" operation at the point labeled, "m1 x", and after this point there is no owner of the mutex m1. Generally, as explained above, a control program may become a waiter for any mutex right as it enters the mutex. If there is no owner when a control program enters the mutex, it immediately becomes the owner, its enter operation returns, and the control program continues. If there is another owner, the control program is a waiter, and its enter operation will not return until the control program becomes an owner. For clarity in illustration, the actions of the thread t2 are shown to the right of the actions of the thread t1; however, this is only one possible timeline for these events. As the synchronization matrix 400 itself does not necessarily contain any data requiring or even suggesting this ordering, it should be understood that if the thread t2 arrives at the mutex m1 before the thread t1, the thread t1 may be a waiter for the mutex m1 while the thread t2 owns the mutex m1 instead.

Figure 5:
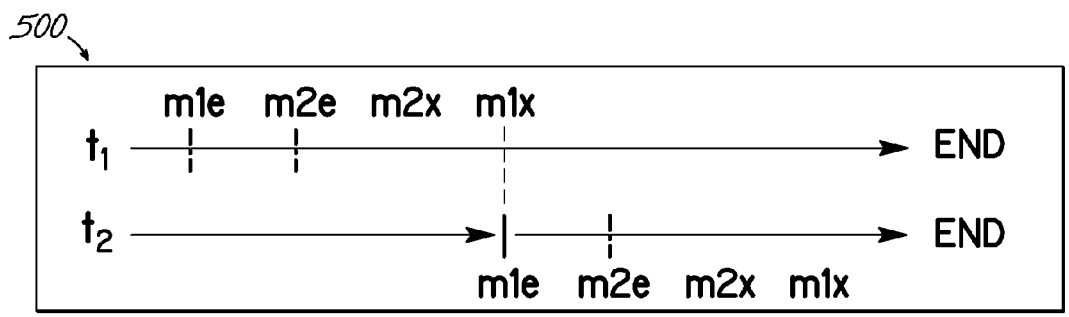
FIG. 5 is a diagram illustrating another synchronization matrix having mutex objects in accordance with embodiments of the invention.

As shown in FIG. 5, the matrix 500 represents the sharing by two control program threads t1, t2 of two resources represented by mutexes m1, m2. At the point represented in each row by "m2e", the control program becomes an owner of both m1 and m2. However, in this case t2 is forced to wait until t1 has relinquished m1 before taking either m1 or m2; that is, both t1 and t2 take mutexes m1 and m2 in the same order. Thus neither t1 nor t2 owns a mutex while waiting on another. Thus, MCC 2, "Own and Wait" is not satisfied. Thus, there is no deadlock between these two programs t1, t2 for these two synchronization objects m1, m2 as shown in FIG. 5.

Figure 6:
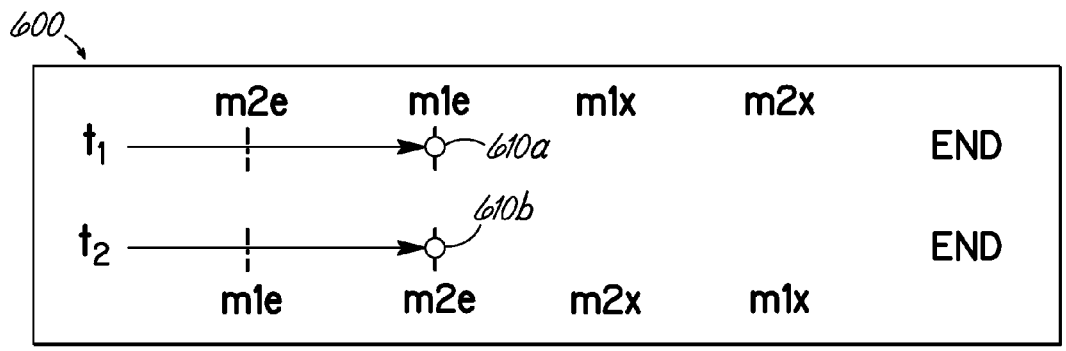
FIG. 6 is a diagram illustrating another synchronization matrix having mutex objects in accordance with embodiments of the invention.
Figure 6A:
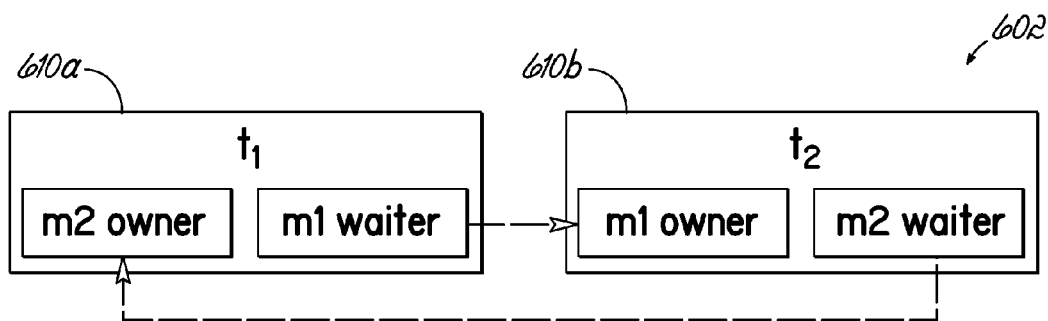
FIG. 6A is a diagram illustrating a circular wait cycle in accordance with the synchronization matrix of FIG. 6.

A basic mutex deadlock is represented by the synchronization matrix 600 shown in FIG. 6. Here, at the time when t1 calls its enter operation for m1, point 610a, it is an owner for m2 and a waiter for m1. At the time when t2 calls its enter operation for m2, point 610b, it is an owner for m1 and a waiter for m2. This loop represents a deadlock, as shown by the cycle diagram 602 in FIG. 6A.

In the following examples presented in this application, the circular wait requirement of MCC 4 will be illustrated in the accompanying Drawings by the use of cycle diagrams, each of which will represent a completed cycle of owner-waiter pairs that constitute a circular wait. As described with respect to the flowchart 300 of FIG. 3, it will be understood that the circular wait may be represented within the system as a list, multiple lists, or any other appropriate data object or objects.

It will also be understood that some methods of identifying the deadlock will not record all of the information shown in the cycle diagrams; for example, in some embodiments, the devices controlled by the program threads may be identified rather than the threads themselves, and the synchronization objects may or may not be explicitly identified. One of ordinary skill will recognize that preserving all information required to analyze and identify deadlocks is not itself a requirement of the invention.

Figure 7:
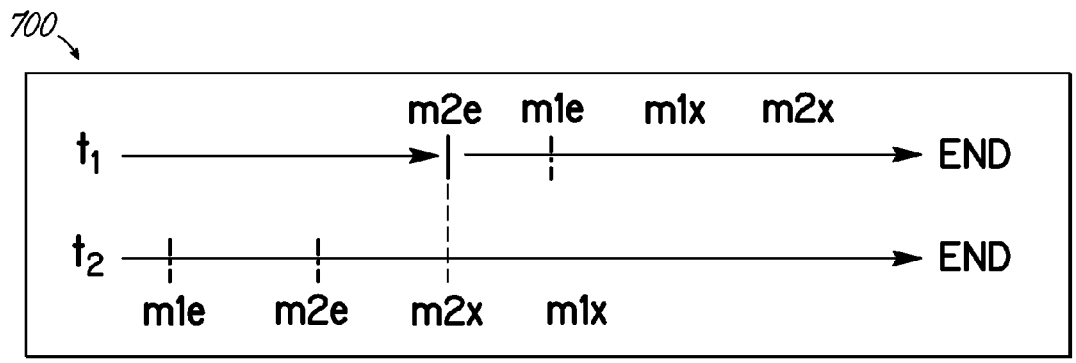
FIG. 7 is a diagram illustrating the synchronization matrix of FIG. 6 with events sequenced so that deadlock does not occur.

As illustrated in FIG. 7, not all cycle diagrams result in actual deadlocks. The order of mutexes taken by each thread of FIG. 7 is the same as that of FIG. 6. However by means of the positioning of the actions of the control programs t1, t2 shown in the matrix 700 of FIG. 7, if the second control program t2 enters the mutex m2 before the first control program t1, there will be no actual deadlock in the sharing of these resources between these two control programs. Because not all potential deadlocks are realized in every running of a system, a test run is insufficient to identify all potential deadlocks.

Figure 8:
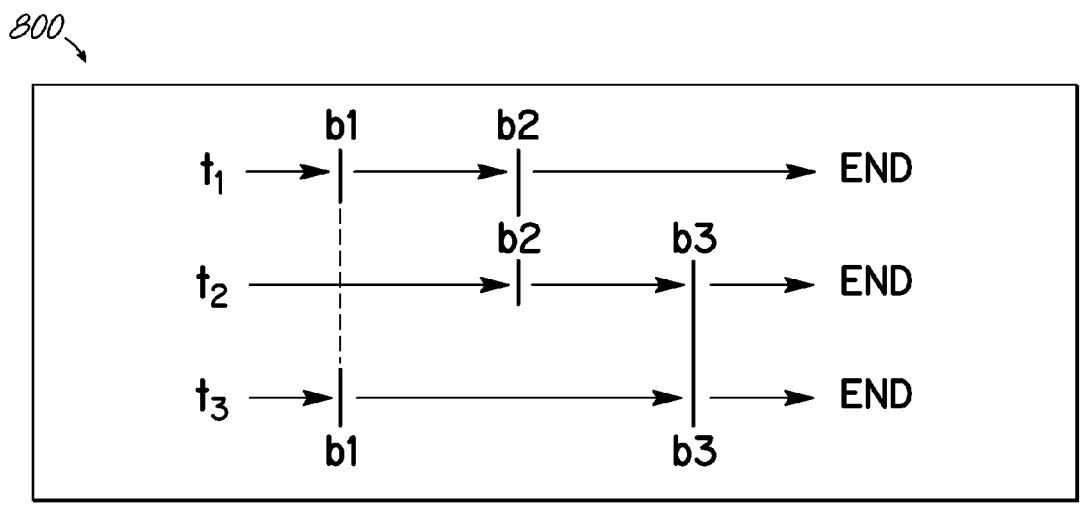
FIG. 8 is a diagram illustrating a synchronization matrix with barrier objects in accordance with embodiments of the invention.

The synchronization matrix 800 in FIG. 8 shows synchronization of three control programs t1, t2, t3 by means of barriers b1, b2, b3 as shown. Each barrier marked "b1", for example, represents the control program arriving at that barrier. As explained above and understood in the art, each program that arrives at a barrier will wait until all the correct threads have arrived at the barrier.

As earlier explained, a control program thread is considered to be an owner of a barrier from initialization until it arrives at the barrier and becomes a waiter for that barrier. Therefore, at the point marked "b1", the program thread t1 has arrived at the barrier b1 and is a waiter for b1, while the program thread t1 has not yet arrived at the thread b2 and so is an owner for b2. Similarly, at "b2" the thread t2 is a waiter for b2 and an owner for b3, and at "b1" the thread t3 is a waiter for b1 and an owner for b3. No cycle is formed by these points.

Figure 9:
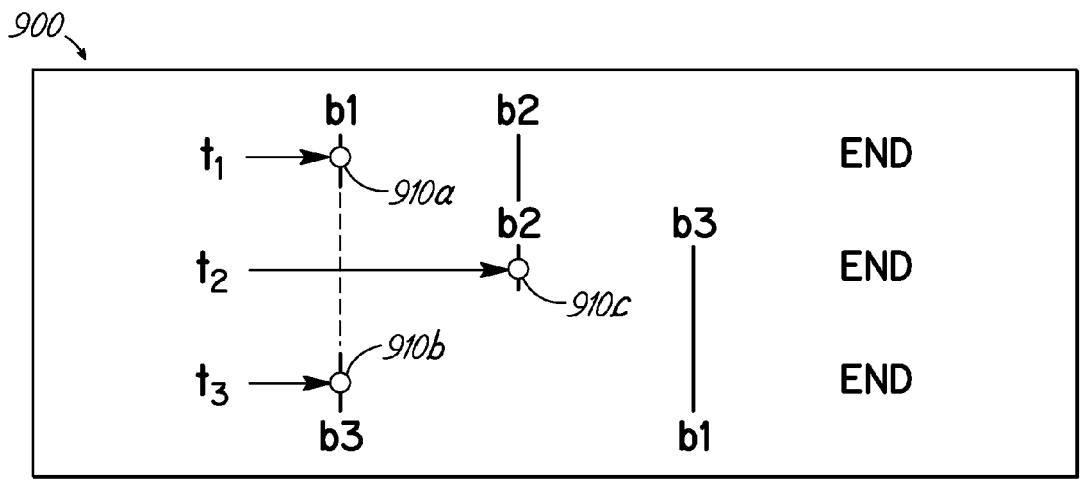
FIG. 9 is a diagram illustrating another synchronization matrix with barrier objects in accordance with embodiments of the invention.
Figure 9A:
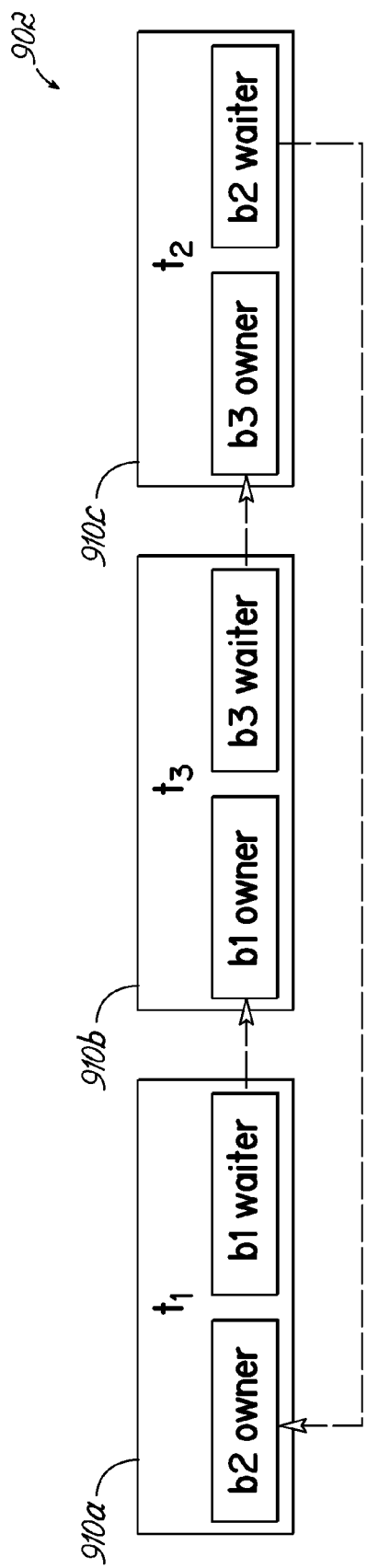
FIG. 9A is a diagram illustrating a circular wait cycle in accordance with the synchronization matrix of FIG. 9.

However, a reversal of the barriers b1, b3 in the thread t3 demonstrates a barrier deadlock, as shown by the synchronization matrix 900 of FIG. 9 and cycle diagram 902 of FIG. 9A. Here, when t1 arrives at b1, at point 910a, it is an owner for b2 and a waiter for b1. When t3 arrives at b3, at point 910c, it is an owner for b1 and a waiter for b3. When t2 arrives at b2, at point 910b, it is an owner for b3 and a waiter for b2. This creates a cycle which will form an actual deadlock, since none of the three control programs will ever progress past the first barrier at which they arrive.

Figure 10:
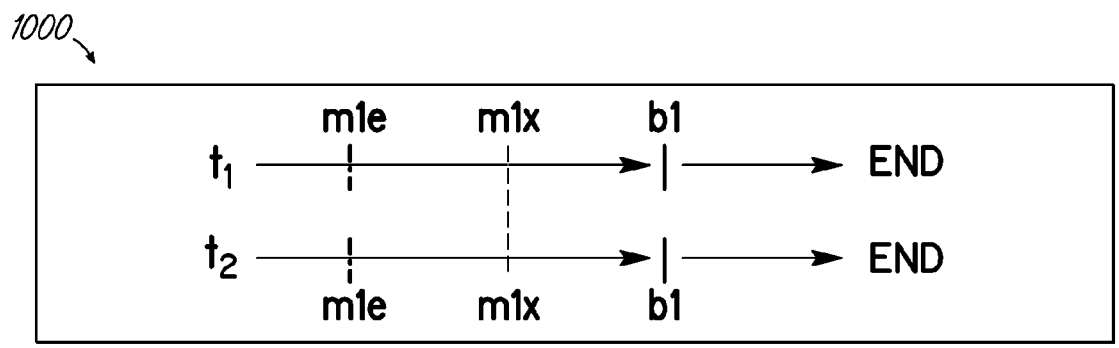
FIG. 10 is a diagram illustrating a synchronization matrix with both mutex and barrier objects in accordance with embodiments of the invention.
Figure 11:
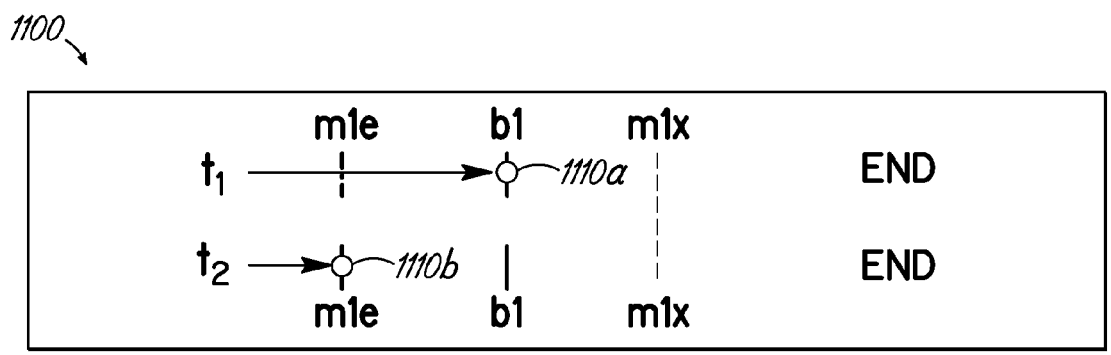
FIG. 11 is a diagram illustrating another synchronization matrix with both mutex and barrier objects in accordance with embodiments of the invention.
Figure 11A:
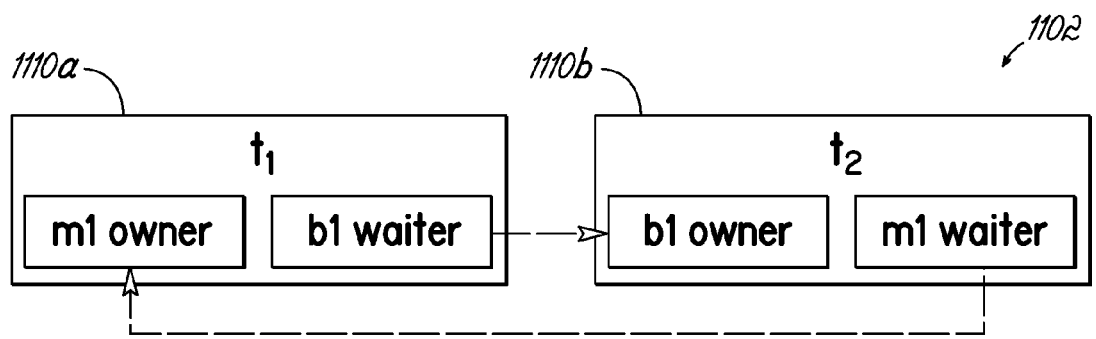
FIG. 11A is a diagram illustrating a circular wait cycle in accordance with the synchronization matrix of FIG. 11.

Under this new uniform framework defining ownership of barriers as well as mutexes, it is possible to find deadlocks between mutexes and barriers. The synchronization matrix 1000 of FIG. 10 shows a pair of control program threads in which a mutex m1 and barrier b1 are both shared with no deadlock, because each thread clears the mutex m1 before arriving at the barrier b1. In contrast, the matrix 1100 of FIG. 11 and cycle diagram 1102 of FIG. 11A show the same two synchronization objects used by a pair of control program threads in a way that deadlocks. When t1 arrives at b1, at point 1110a, it is an owner of m1 and a waiter of b1. When t2 arrives at m1, at point 1110b, it is an owner of b1 and a waiter of m1. This cycle 1102 results in a deadlock between them. Note that even in this simple and obvious example, it is not possible to generate the cycle diagram without the concept of ownership of barriers.

Figure 12:
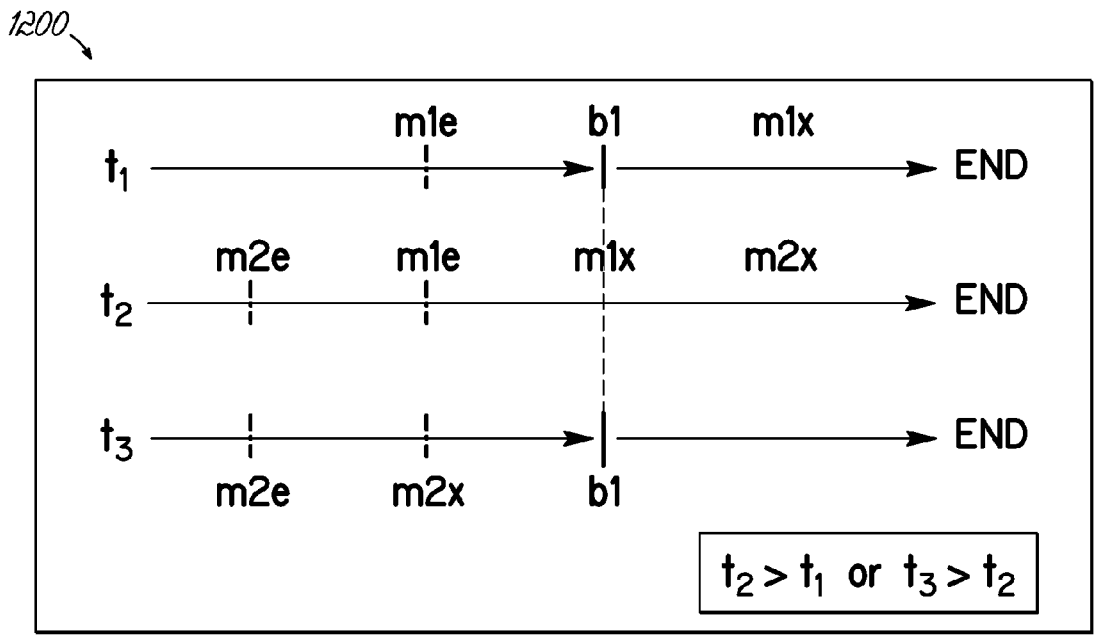
FIG. 12 is a diagram illustrating a three-thread synchronization matrix with both mutex and barrier objects and timing-dependent deadlock in accordance with embodiments of the invention.
Figure 12:
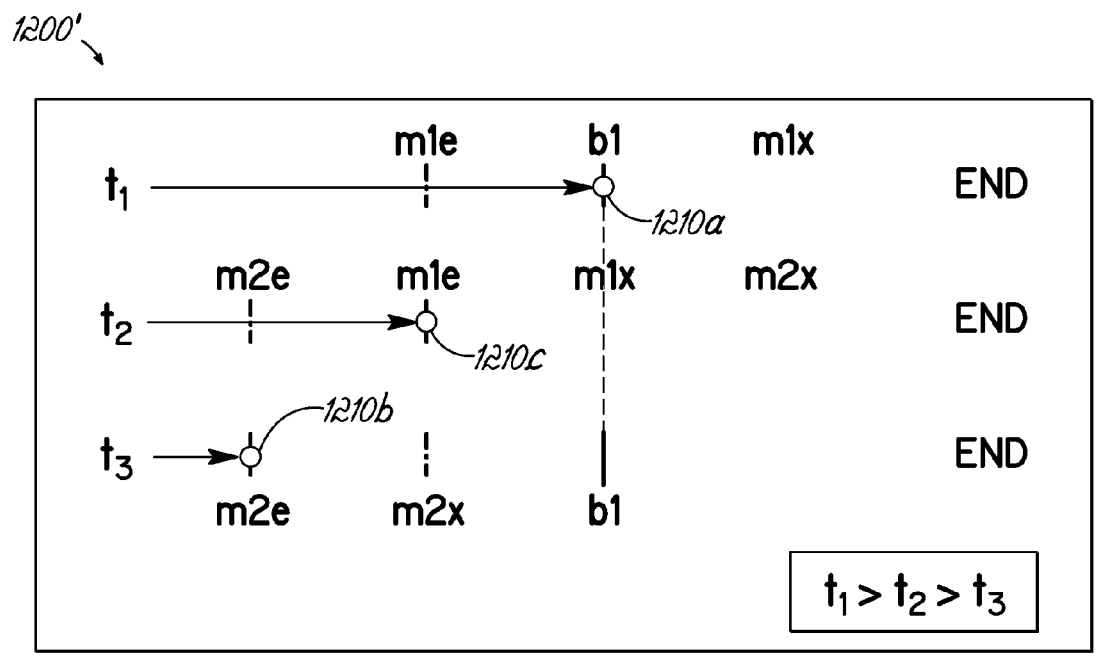

As a more sophisticated example, the synchronization matrix 1200 in FIG. 12 may run without deadlocking on many occasions. If the thread t2 enters the mutex m1 before t1, or if the thread t3 enters the mutex m2 before t2, then the control program threads t1, t2, t3 will run to completion without a deadlock. However, a deadlock is possible as shown by the cycle diagram 1202 of FIG. 12A and points made available on the synchronization matrix 1200' shown in FIG. 12' (which is the same synchronization matrix as the matrix 1200 shown in FIG. 12, but with the arrows and points marking the deadlock). If the order of execution of the three threads is t1 followed by t2 followed by t3, the deadlock cycle will occur. In any other order, no deadlock will occur. In the deadlock case, t1 starts first and will take m1 and arrive at b1, at point 1210a. It is an owner of m1 and a waiter of b1. Thread t2 starts second, takes m2 and waits at m1, at point 1210c. It is an owner of m2 and a waiter of m1. Thread t3 starts last and waits at m2, at point 1210b. It is an owner of b1 and a waiter of m2.

Figure 13:
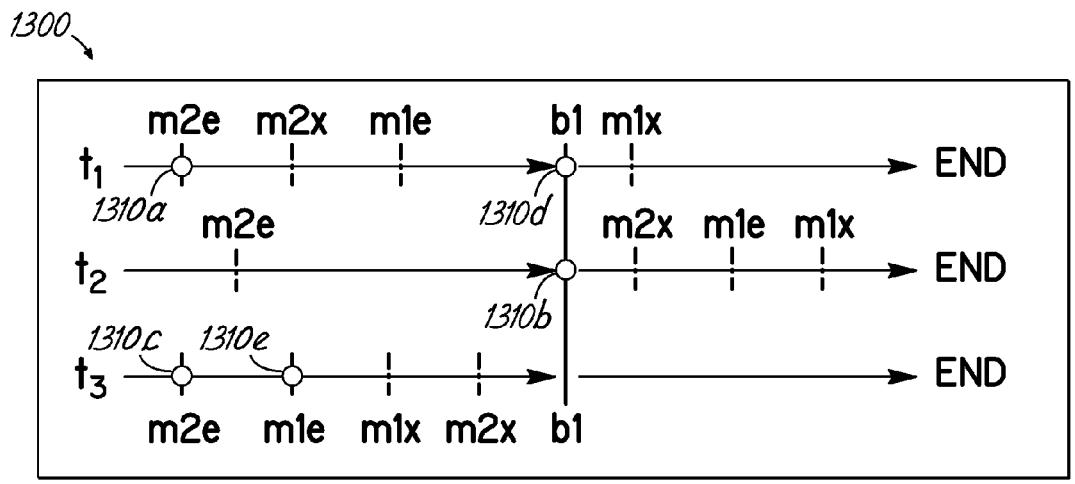
FIG. 13 is another diagram illustrating a three-thread synchronization matrix with both mutex and barrier objects and timing-dependent deadlock in accordance with embodiments of the invention.
Figure 13A:
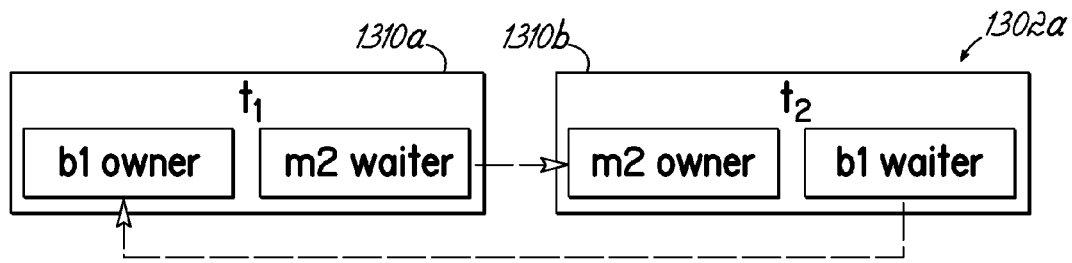
FIG. 13A is a diagram illustrating a circular wait cycle in accordance with the synchronization matrix of FIG. 13.
Figure 13B:
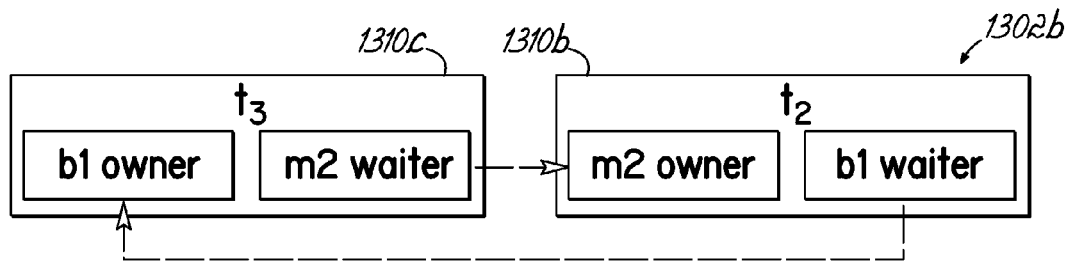
FIG. 13B is another diagram illustrating another circular wait cycle in accordance with the synchronization matrix of FIG. 13.
Figure 13C:
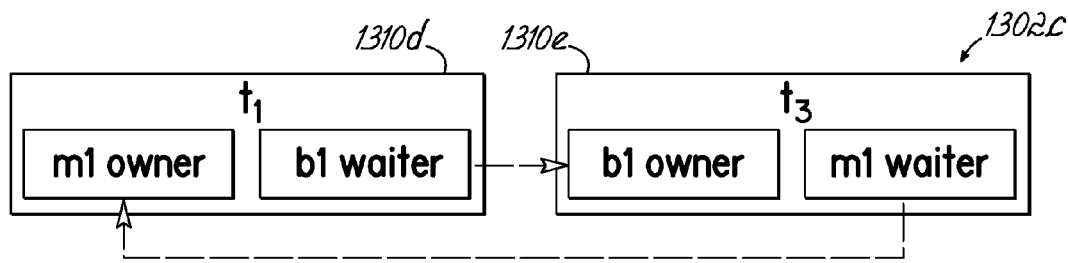
FIG. 13C is another diagram illustrating another circular wait cycle in accordance with the synchronization matrix of FIG. 13.

Likewise, consider the synchronization 1300 of FIG. 13, which uses two mutex objects m1, m2 and a barrier b1. Here, three different cycles 1302a, 1302b, 1302c result in possible deadlocks depending on the relative timing of the three control program threads t1, t2, t3. When t1 "enters" m2 at point 1310a, it is an owner of b1 and a waiter of m2; when t2 arrives at b1 at point 1310b, it is an owner of m2 and a waiter of b1. Similarly, when t3 "enters" m2 at point 1310c, it is an owner of b1 and a waiter of m2; when t2 arrives at b1 at point 1310b, it is an owner of m2 and a waiter of b1. Thus, unless t1 and t3 both queue for m2 before t2, a deadlock will occur. Additionally, when t1 arrives at b1 at point 1310d, it is an owner of m1 and a waiter of b1; when t3 "enters" m1 at point 1310e, it is an owner of b1 and a waiter of m1. This means that t3 needs to enter m1 before t2, and in fact, if t3 enters m2 followed by t1 and then t2, no deadlock will result.

Figure 14:
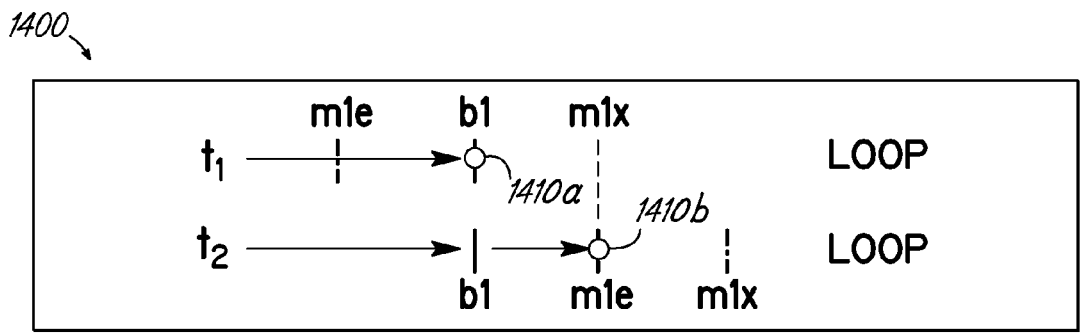
FIG. 14 is a diagram illustrating a synchronization matrix including looping execution of threads in accordance with embodiments of the invention.

In some systems, one or more of the control program threads may end and restart asynchronously. In a system where it is possible for some threads to loop while others continue with a single execution, it is necessary to view the ownership of barriers slightly differently. As shown in FIG. 14, if the thread t2 is waiting at mutex m1 at point 1410b having already passed the barrier b1 as shown, it is no longer considered an owner of the barrier b1 under a single execution framework. However, because the threads t1 and t2 may loop asynchronously, it is possible for the thread t1 to wait at b1 at point 1410a while owning m1 and while the thread t2 has previously passed the barrier b1 and is waiting at m1 at point 1410b. This is a deadlock.

Because such deadlocks are possible, when considering threads that do not execute once uniformly but rather loop asynchronously, a thread that is a partner for a barrier is always an owner of a barrier unless it is waiting at the barrier. By identifying the thread t2 shown in the matrix 1400 as an owner of the barrier b1 as well as a waiter of the mutex m1 when at point 1410b, the deadlock can be properly identified by the system between t2 waiting to enter m1 and t1 waiting at b1.

The examples above reflect the analysis and detection of deadlocks involving mutex and barrier synchronization objects. The same process can be generalized for each of the other synchronization object types.

For a sequence element, at least one of the partners signals arrival at the synchronization object but does not wait there; other partners wait at the sequence element until other partners arrive, just as in a barrier. Therefore, the sequence element is analyzed as a barrier except that signaling threads are never waiters with respect to it, only owners.

Figure 15:
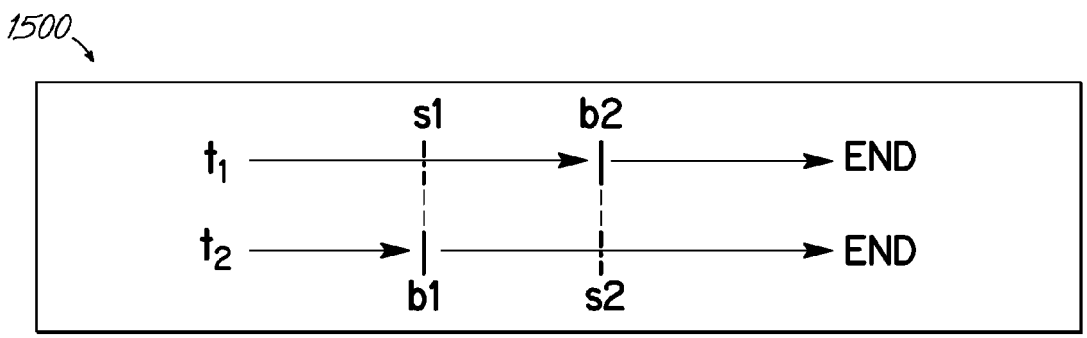
FIG. 15 is a diagram illustrating a synchronization matrix with sequence elements in accordance with embodiments of the invention.

FIG. 15 illustrates a synchronization matrix 1500 including sequence elements. A thread that waits at a sequence element shows it as a barrier, shown as "b1" in thread t2's timeline and "b2" in thread t1's timeline; a thread that signals a sequence element without waiting lists it as a signaling action, shown as "s1" in thread t1's timeline and "s2" in thread t2's timeline as shown in FIG. 15. Both "s1" and "b1" refer to the same synchronization object, as do "s2" and "b2". Because the thread t1 does not wait at the sequencing element represented by "s1", it is never a waiter for s1/b1 and an owner for s2/b2, and so no deadlock results between the thread t1 and the thread t2.

Figure 16:
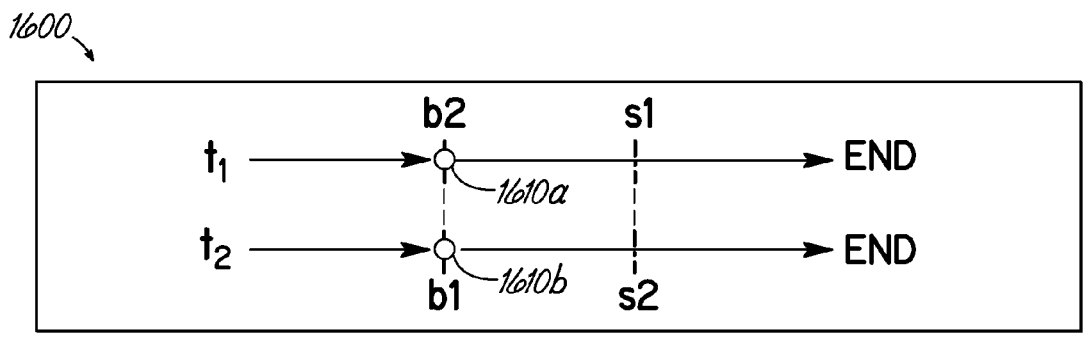
FIG. 16 is a diagram illustrating another synchronization matrix with sequence elements in accordance with embodiments of the invention.
Figure 16A:
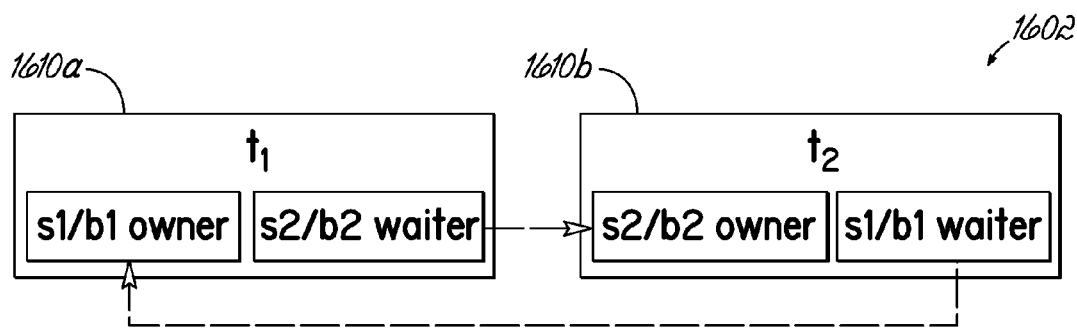
FIG. 16A is a diagram illustrating a circular wait cycle in accordance with the synchronization matrix of FIG. 16.

In contrast, FIG. 16 illustrates a synchronization matrix 1600 in which a deadlock, shown by the cycle diagram 1602 in FIG. 16A, will occur. Because t1 owns s1/b1 while waiting at b2 at point 1610a and t2 owns s2/b2 while waiting at b1 at point 1610b, a deadlock results.

Figure 17:
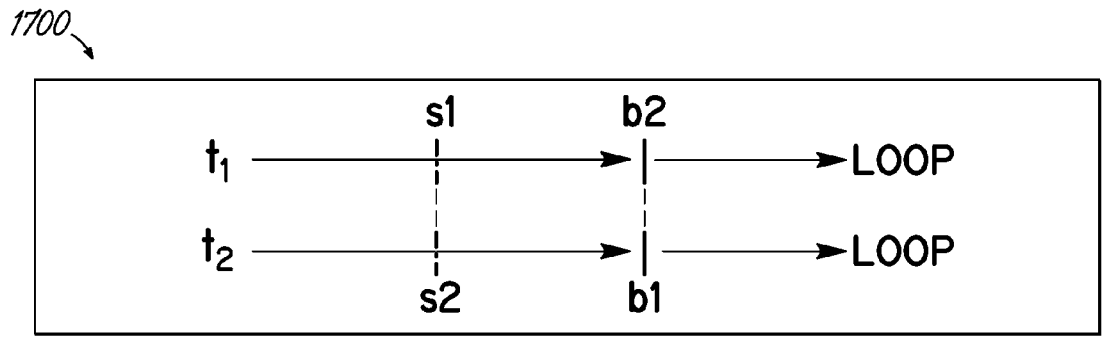
FIG. 17 is a diagram illustrating a synchronization matrix with sequence elements including looping execution of threads in accordance with embodiments of the invention.

As explained above with respect to barriers, loops also cause signaling threads to maintain ownership of the sequence element after they have signaled. As a simple example, the timeline 1700 of FIG. 17 includes a potential deadlock because both sequence elements b1/s1 and b2/s2 are owned by both thread t1 and thread t2 whenever they are not waiting at them. Should a signal be missed or an extra signal introduced such that both t1 and t2 arrive at their barrier objects simultaneously, a deadlock will result. The common example in industrial applications is the use of program line selection during testing/debugging operations, where it is possible to start a program somewhere other than its normal start point. Deadlocks that are not encountered normally can occur in such situations.

Figure 18:
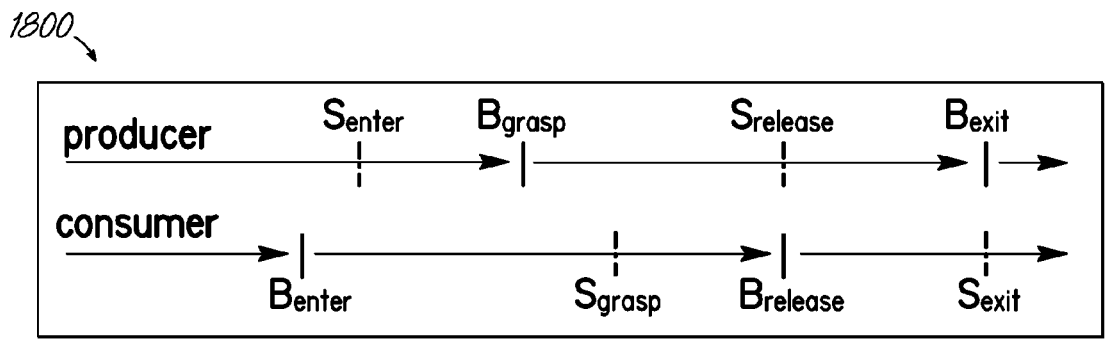
FIG. 18 is a diagram illustrating a synchronization matrix with sequence elements representing a hand-off in accordance with embodiments of the invention.

Hand-offs and multi-sequence elements can be analyzed as a set of sequence elements that alternate between each of the two involved threads being a signaler and the other a waiter. A standard hand-off is illustrated in FIG. 18 as a synchronization matrix 1800, with each of the standard hand-off commands "enter", "grasp", "release", and "exit" being one such sequence element. Additional synchronization object events may be included within this timeline. If no other synchronization events are involved during the hand-off, the entire hand-off can be analyzed as a single barrier object for both partners.

Buffers can also be modeled as synchronization objects, but the different behavior of empty and full buffers require the use of three different thread timelines to do so, as well as the distinguishing of producers and consumers for each buffer object.

Figure 19:
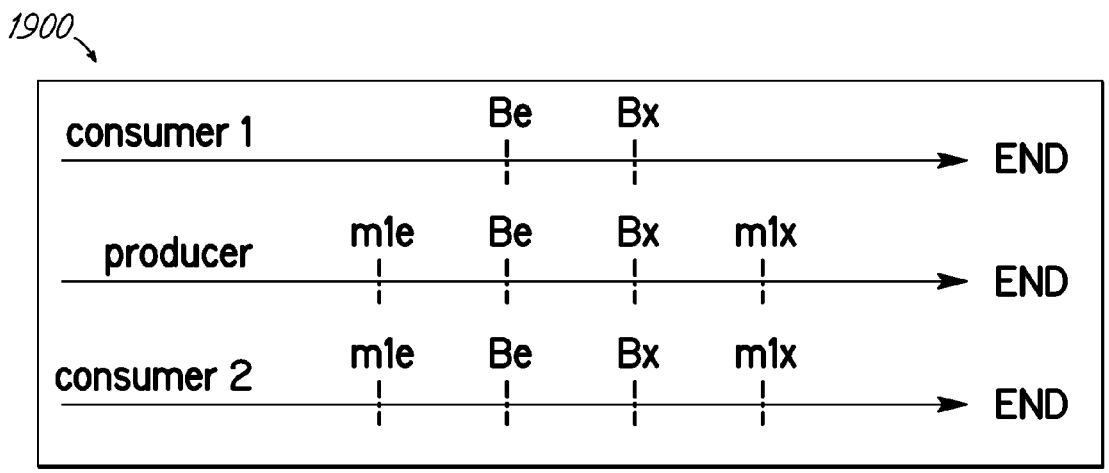
FIG. 19 is a diagram illustrating a synchronization matrix with a free-state buffer in accordance with embodiments of the invention.
Figure 20:
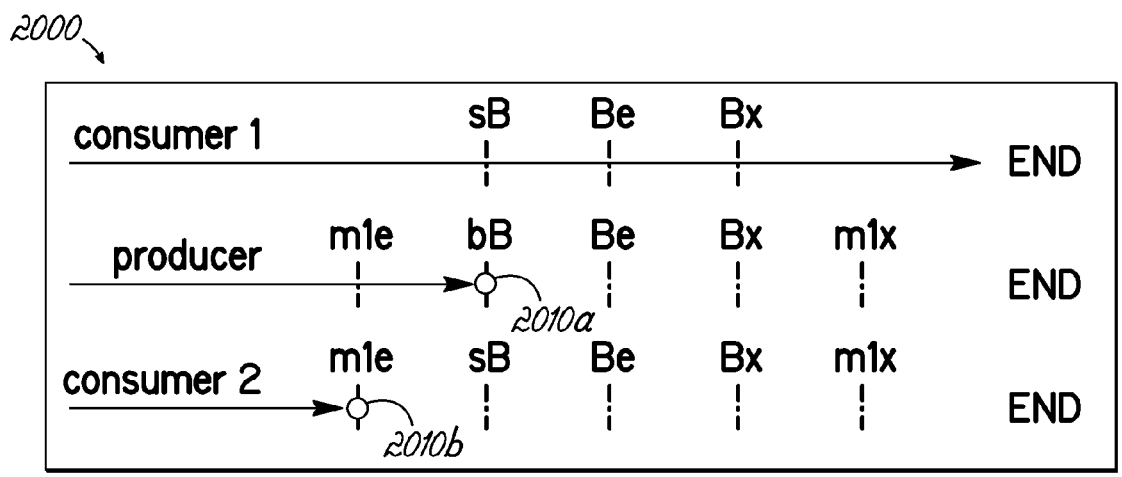
FIG. 20 is a diagram illustrating a synchronization matrix with an empty buffer in accordance with embodiments of the invention.
Figure 20A:
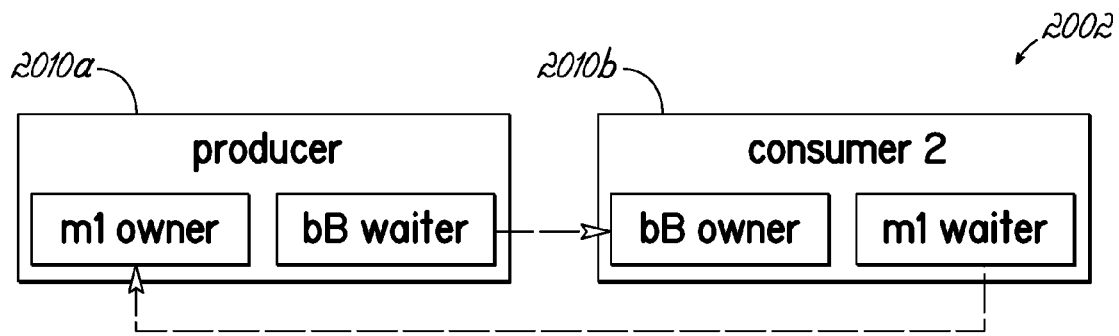
FIG. 20A is a diagram illustrating a circular wait cycle in accordance with the synchronization matrix of FIG. 20.
Figure 21:
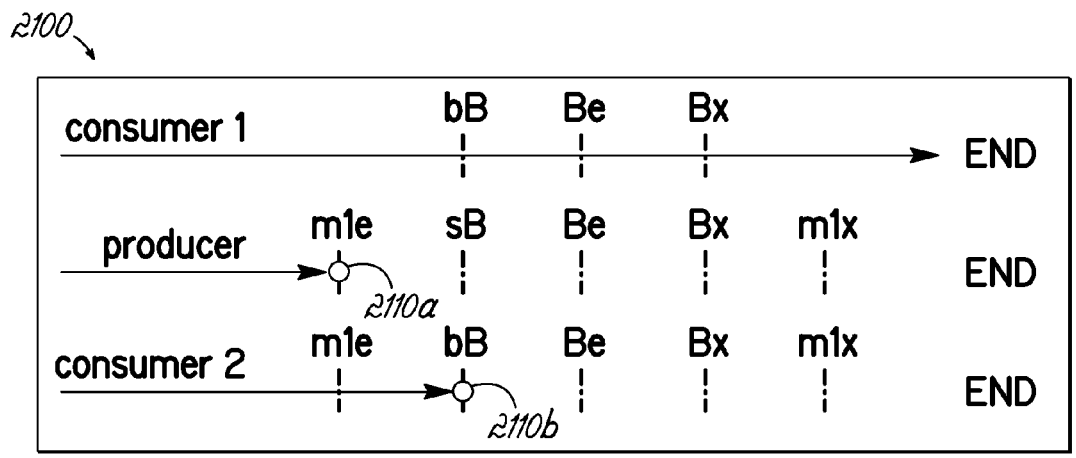
FIG. 21 is a diagram illustrating a synchronization matrix with a full buffer in accordance with embodiments of the invention.
Figure 21A:
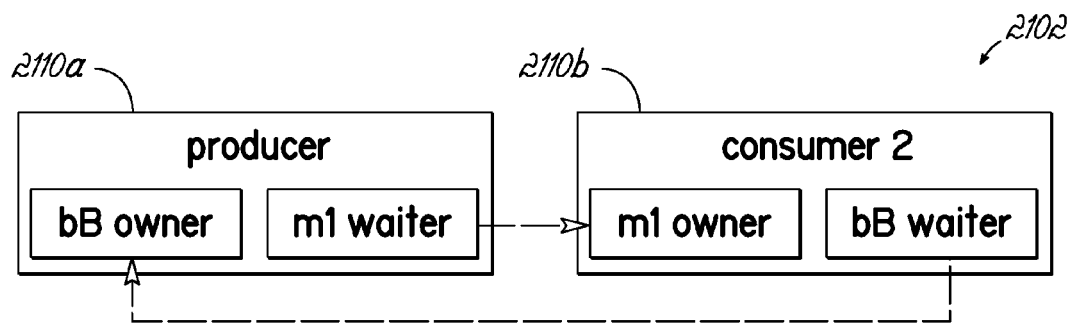
FIG. 21A is a diagram illustrating a circular wait cycle in accordance with the synchronization matrix of FIG. 21.

Generally a buffer can be analyzed as a mutex when it is neither full nor empty. A full or empty buffer is a mutex combined with a sequence element wherein a producer signals an empty buffer and waits at a full buffer, while a consumer signals a full buffer and waits at a full buffer. As shown in the synchronization matrices 1900, 2000, and 2100 shown in FIGS. 19-21, the addition of the sequence elements for full and empty buffers may create a deadlock when the buffer is empty or full that it does not experience otherwise. The free-state buffer, as shown in FIG. 19, having two possible consumer threads and one producer threads, does not show a possible deadlock. However, when the buffer is full (matrix 2000 of FIG. 20) or empty (matrix 2100 of FIG. 21), deadlocks exist, shown in cycle diagrams 2002 of FIG. 20A and 2102 of FIG. 21A. In the case of the full buffer shown in FIG. 20, the producer thread owns the mutex m1 and waits at the buffer B at point 2010a, while the consumer2 thread owns the buffer B and waits at the mutex m1 at point 2010b. Similarly, when the buffer is empty as shown in FIG. 21, the producer thread owns the buffer B while waiting for the mutex m1 at point 2110a, while the consumer2 thread owns the mutex m1 while waiting for the buffer B at point 2110b.

Fixtures are a special type of two-partner buffer with a capacity of 1. A fixture can be modeled within a synchronization matrix as a sequence element wherein the producer or consumer is the signaler depending on whether the buffer is empty or full.

The time synchronization object requires simultaneous execution among partners and cannot include other synchronization objects within it, and therefore is modeled within the synchronization matrix as a barrier.

The preceding examples of synchronization matrices are general illustrations that represent exemplary embodiments of how the data associated with a synchronization matrix might be stored. One of ordinary skill in the art will understand that the data necessary to carry out the detection analysis as herein disclosed may be stored in a variety of forms and formats, and that the methods described herein, while requiring certain data as detailed, may process a wide variety of data according to the present invention.

In different systems, the synchronization matrix may be produced and/or stored in a variety of ways. The synchronization matrix may be included in configuration files, in separate files including declaration sections, or even generated automatically from existing data during runtime.

Figure 22:
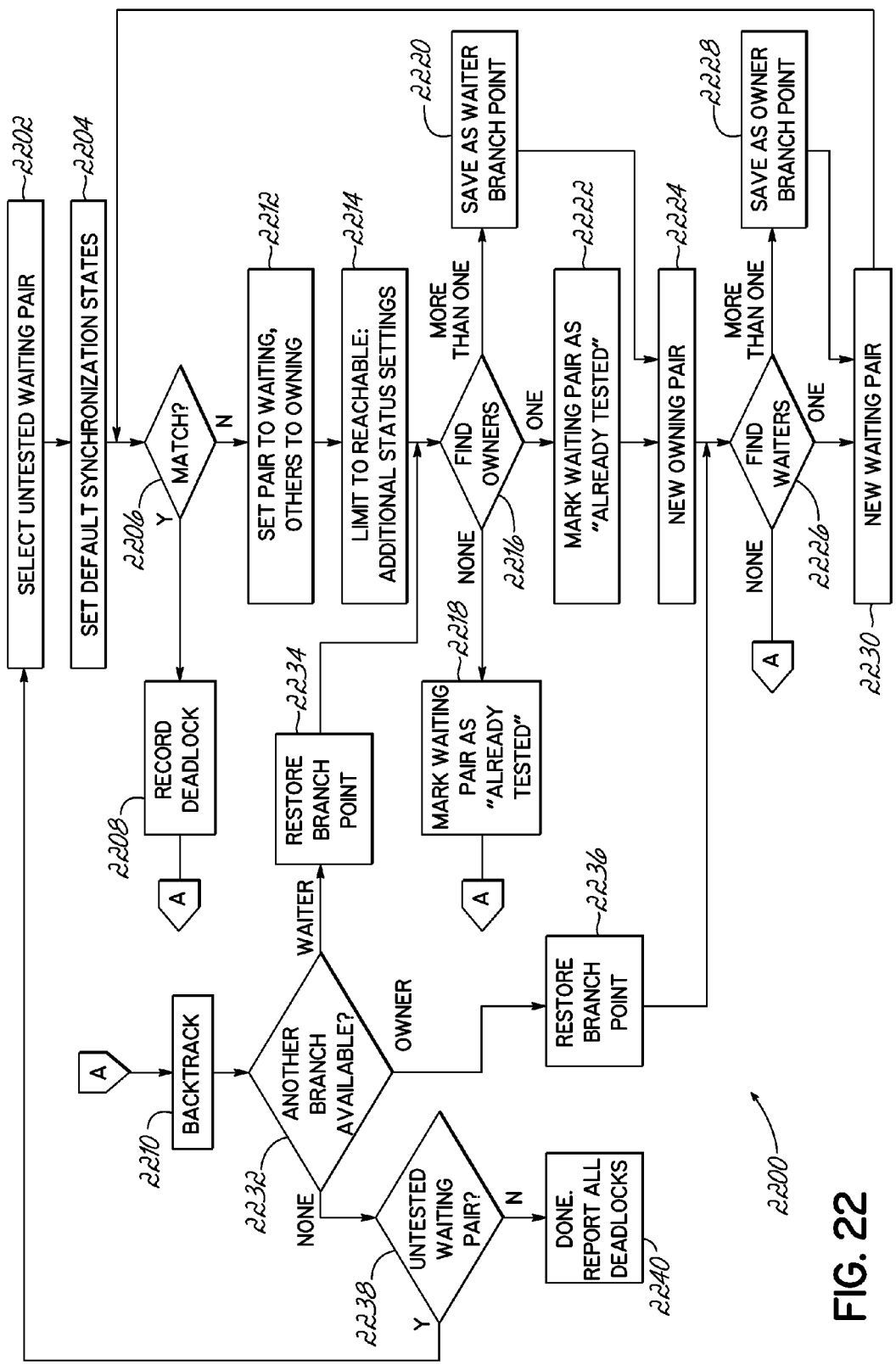
FIG. 22 is a flowchart illustrating a deadlock analysis process in accordance with embodiments of the invention.

As outlined in the flowchart 2200 of FIG. 22, a general deadlock analysis of a synchronization process is essentially a fully exhaustive tree search of all possible combinations of thread/object pairs in an attempt to identify all possible deadlocks. Such a search can be lengthy and resource-intensive. However, unlike with deadlock detection, the purpose of the deadlock analysis is generally preventative. Therefore, it will be understood that a deadlock analysis may be performed on a synchronization matrix for a system before the system is assembled and implemented, as early as the planning stage. Similarly, the deadlock analysis does not necessarily need to be performed in realtime, but instead can be performed offline using the necessary resources and time for it to complete.

In one embodiment, a deadlock analysis as outlined in the flowchart of 2200 of FIG. 22 may begin by selecting an untested waiting pair—that is, a thread that can be identified as being a waiter for a synchronization object according to the synchronization matrix (block 2202). When every waiting pair is marked as tested, then the entire analysis is complete. The testing state of each pair as "already tested" or "untested" is the only state that persists between tests of initial waiting pairs.

Each (thread, object) pair within the synchronization matrix can be assigned a synchronization state during the test of each initial waiting pair. In one embodiment, five different synchronization states are available—waiting, owning, not blocking, available, or uninitialized. Waiting and owning pairs are those that fit the waiting and owning definitions as previously described. A thread associated with a sequence element that it signals is in the not blocking state once it passes its signal point. When a synchronization object has no waiters or owners, such as an unoccupied mutex or passed barrier, all of the pairs including that object are available. Finally, the uninitialized state is a placeholder state assigned to barriers that have not yet been encountered in a given branch of the search. At the beginning of the search, we set every mutex pair to available, and every sequence element or barrier pair to uninitiated (block 2204).

The synchronization state of each pair in the matrix is saved at certain branch points along the search so that it can be reinitialized when returning to these branch points. Note that these saving and resetting steps do not affect the testing state of pairs, which moves from "untested" to "already tested" and then never resets during the deadlock analysis.

Waiting and owning pairs are added to a deadlock list to represent the current path of the search that may result in a circular wait cycle identifying a deadlock. Each time a new waiting pair is added to the deadlock list, the deadlock list is first searched to determine if the new waiting pair already exists within the deadlock list (block 2206). If so, then a deadlock has been found. The current deadlock list is saved and recorded as a deadlock (block 2208), and the search backtracks to the next unsearched branch (block 2210).

Otherwise, the state of the new waiting pair is set to waiting, and the state of all other pairs in the matrix involving the same synchronization object are set to owning (block 2212). At this point, other additional states may be set in order to eliminate the identification of deadlocks that are theoretically unreachable (block 2214), which will be detailed below.

Beginning with the next partner row in the matrix, all owning pairs are identified for the object in the new waiting pair (block 2216). This involves searching the matrix, incrementing by partner row, to find each pair with the same synchronization object as the new waiting pair and the owning state. If no owning pair is found, then the new waiting pair cannot be part of any deadlock loop, and is marked "already tested" (block 2218). Since the test state persists throughout the deadlock analysis, this waiting pair is excluded as an eligible initial or new waiting pair for the rest of the analysis. The search backtracks to the most recent branch point (block 2210).

If multiple owning pairs are found, then the new waiting pair is identified as a waiter branch point (block 2220). Each branch represented by an owning pair will be tested in turn each time the waiter branch point is returned to. The current matrix state is saved, and the pairs reset to the saved state each time the process returns to the matrix state. When only one owning pair remains to be tested, whether because only one was found or because the search has returned to the last owner pair from this branch point, the new waiting pair is marked as "already tested" to prevent further unnecessary duplication (block 2222).

For each new owning pair identified for the new waiting pair (block 2224), the partner row containing the owning pair is searched to find a pair eligible to be a waiting pair (block 2226). Each identified waiting pair must meet the following conditions. If the object of the new owning pair is a mutex, then the eligible waiting pairs must be after the owning pair in the partner row, and before exit of the mutex. If the object of the new owning pair is a barrier or sequence element signaler, then the eligible waiting pairs must be before the owning pair, except that waiting pairs after the owning pair must be considered if the analysis includes loops. Pairs with the "already tested" regardless of their current state, pairs for sequence element signalers, barrier pairs in the available state, and pairs in the owner state are not eligible.

If no eligible waiter is found, then backtrack to the next branch point (block 2210). If multiple waiting pairs are qualified, mark the new owner pair as an owner branch point and save the current matrix state for use whenever this branch point is returned to (block 2228). Choosing the first eligible waiting pair as the new waiting pair (block 2230), continue the analysis (returning to decision block 2206).

Each time that the search backtracks (block 2210), whether from a recorded match at block 2206, failing to find an unsearched owner pair at block 2216, or failing to find an eligible waiting pair at block 2228, the search continues by finding the next unsearched branch at a saved branch point (decision block 2232). If the most recent saved branch point is a waiter branch point, then that branch point's settings are restored (block 2234) and the search continues for an owning pair matching the current waiting pair (block 2216). If the most recent saved branch point is an owner branch point, then that branch point's settings are restored (block 2236), and the search continues for a waiting pair matching the current owning pair (block 2224).

Once all branches have been explored and the backtrack has reached the original waiting pair, such that no additional branches are available to search ("none" branch of decision block 2232), then the selected initial waiting pair is fully searched. If any waiting pairs remain in the "untested" testing state ("yes" branch of decision block 2238), another waiting pair can be selected as the initial pair (block 2202), and the analysis continues with that initial pair. If all waiting pairs are in the "already tested" testing state ("no" branch of decision block 2238), then the deadlock analysis is complete. The entire synchronization matrix has been searched, and recorded deadlocks are reported (branch 2240).

As described above, the deadlock analysis will also report theoretically unreachable deadlock states. As mentioned above with respect to the block 2214, it is possible to include additional synchronization status settings in order to reduce the report of unreachable deadlocks. Whenever a new waiting pair is identified and tested, set each previous mutex pair that has not yet been exited (representing each mutex that the thread should still own at the point in time representing by the waiting pair) to owning, and all pairs in other partner rows including these mutexes to waiting. Similarly, any passed barrier pair currently set as uninitialized is instead set to available, and all pairs in other partner rows including these barriers are also set to available. Set each passed sequence element signaler to not blocking.

Having included these additional synchronization state settings at block 2214, additional conditions are necessary at block 2226 to identify an eligible pair. Any potentially eligible pair must not have any previous pair with a mutex object that is in a waiting synchronization state. Additionally, unless the analysis allows for looping of the threads, no pair having a barrier or sequence element signaler prior to the eligible waiting pair may be in an owning synchronization state. These additional disqualifications for eligibility stop the deadlock analyzer from considering wait cycles which would require synchronization states for other pairs that are incompatible with the waiting pair being considered, and therefore impossible during a normal run.

Once the deadlock analysis process is run as shown in FIG. 22 and described with respect to each waiting pair, and every waiting pair is labeled as "already tested", all deadlock lists possible from the current synchronization matrix are generated and may be analyzed to correct potential problems and troubleshoot the synchronization objects and control threads used in the system.

One of ordinary skill will recognize that, especially with regard to the significant size of the full synchronization matrix involving all of the control program threads and all objects for a large industrial system, it may not always be practicable to run the exhaustive search of the entire matrix outlined above. It will therefore be recognized that the full synchronization matrix may, under certain conditions, be split into multiple separate matrices which can be analyzed independently. As the analysis may grow exponentially according to the size of the matrix, breaking a large matrix down into separable smaller matrices can greatly reduce the time and resources necessary to run the deadlock analysis.

If partners can be organized into multiple groups that share no synchronization objects between groups, then each set of partners sharing a set of synchronization objects can be evaluated as a separate synchronization matrix.

Where control program threads are operating on more than one different industrial component, it may be possible to isolate all of the actions involving each component into a separate synchronization matrix. This may be determined manually or through use of system integrators that note these relationships during design or simulation.

If a barrier is not nested within any mutex, then each partner row including the barrier can be split to generate two matrices—one before the barrier and one after the barrier. Each partner that does not wait on or signal the barrier must have its entire partner row included in both resulting matrices.

If no barrier is nested within a mutex, then barriers and mutexes can be separated into two different synchronization matrices.

Analysis of mutexes alone can be reordered around any point in which there is no "hold and wait" condition. This means that in the case of a state machine visiting a home condition between a number of lobes, wherein the home condition itself is a free condition (no "hold and wait"), it may be possible to write the synchronization action for each lobe in only one order, and the analysis of the lobes in that order will apply to the lobes in any order that they are run by the state machine. This may greatly simplify the use of this analysis tool with respect to state machine partners. However, where the state machine is written with barriers, it may be necessary to first split the matrix to isolate the scenarios where the home state includes ownership of a barrier as explained above.

Conventional systems may be capable of using the ordering of mutexes to help detect deadlocks. This involves assigning a numerical order to the mutexes. Each time a new mutex is requested by a partner that already owns an existing mutex, the sequence number of the requested mutex must be greater than any mutex already owned by that partner. Otherwise, a warning issues with respect to that partner requesting the mutexes "out of order". If re-ordering the mutexes causes another partner to be flagged with an "out of order" request, then there may be a conflict between the partners' requests of the mutexes and a potential deadlock.

With the expanded understanding of "hold and wait" in the present invention, it is possible to expand sequential numbering as a deadlock detection technique to apply to barrier objects instead.

To test for sequential ordering of synchronization objects, assign barriers lower sequence numbers than mutexes, such that each barrier has a lower number than any mutex. Assign the barrier sequence numbers in the reverse of their expected order, such that the highest sequence number goes to the first barrier expected to be encountered. Assign the mutex objects in expected order as normal, such that the first mutex to be encountered is assigned the lowest number among the mutex objects.

Again, as with the mutex-only case, a partner that requests a new object must only own existing synchronization objects lower in number than the object now requested, or there is a potential conflict between the partner's request and the requests of other partners.

With respect to the testing of each partner individually, this process will flag any case in which a barrier is requested while a mutex is owned. As demonstrated above with several examples, such occurrences often (but not always) result in deadlock, and so it is useful for these occurrences to be flagged. If barriers are mis-ordered for any partner, this will also generate a flag.

Each process and object shown herein is by way of illustration and does not limit the scope of the invention, which may use any number of known techniques to accomplish the methods of the invention and to embody the invention as disclosed herein in a variety of ways. Other variations and uses of the invention disclosed herein will be understood to one of ordinary skill in the art. Therefore, the scope of the invention is limited only by the language of the claims.

What is claimed is:

1. A method of synchronizing control program execution in synchronization objects for a robotic system, the method comprising:
   analyzing a control program for a robot, with at least one processor, to identify a synchronization object that will be utilized by the control program during execution of the program by a controller of the robot, the synchronization object including predefined operations, wherein the synchronization object corresponds to a resource used by the robot;
   generating, with the at least one processor, a partner object associated with the control program, the partner object including execution instructions based at least in part on the predefined operations of the synchronization object; and
   modifying the execution of the control program with the controller of the robot in response to the execution instructions of the partner object.

2. The method of claim 1, wherein modifying the execution of the control program in response to the execution instructions of the partner object includes interrupting the execution of the control program.

3. The method of claim 1, wherein the execution instructions of the partner object include transmitting data to the synchronization object, and waiting for a response from the synchronization object.

4. A method of synchronizing the execution of a plurality of control programs of robots of a robotic system, the method comprising:
   generating a synchronization object, with at least one processor, for a resource used by the robots having predefined operations;
   generating, with the at least one processor, control program data associated with the synchronization object, the control program data identifying control programs that interact with the synchronization object during execution;
   generating a partner object associated with each control program identified by the control program data of the synchronization object, the partner object having execution instructions based at least in part on the predefined operations of the synchronization object; and
   modifying the execution of each identified control program with the controller of the robot based at least in part on the execution instructions of the partner object.

5. The method of claim 4, wherein modifying the execution of the control program is based at least in part on the execution instructions of the partner object includes interrupting the execution of the control program.

6. The method of claim 4, wherein modifying the execution of the control program is based at least in part on the execution instructions of the partner object includes resuming execution of the control program.

* * * * *